(12) United States Patent
Kim et al.

(10) Patent No.: US 12,742,908 B2
(45) Date of Patent: Sep. 22, 2026

(54) METALENS AND ELECTRONIC DEVICE USING THE SAME

(71) Applicant: SAMSUNG ELECTRONICS CO., LTD., Suwon-si (KR)

(72) Inventors: Se Yoon Kim, Suwon-si (KR); Byong Gwon Song, Suwon-si (KR); Du Hyun Lee, Suwon-si (KR); Won Taek Seo, Suwon-si (KR); Jang Woo You, Suwon-si (KR); Yong Seop Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 217 days.

(21) Appl. No.: 18/638,339

(22) Filed: Apr. 17, 2024

(65) Prior Publication Data

US 2025/0138222 A1 May 1, 2025

(30) Foreign Application Priority Data

Oct. 26, 2023 (KR) ........................ 10-2023-0144667

(51) Int. Cl.
*G02B 1/00* (2006.01)
*H04N 23/55* (2023.01)

(52) U.S. Cl.
CPC ............ *G02B 1/002* (2013.01); *H04N 23/55* (2023.01)

(58) Field of Classification Search
CPC ........ G02B 1/002; G02B 1/041; G02B 5/208; G02B 27/005; G02B 2207/101; H04N 23/55; H04N 25/611
See application file for complete search history.

(56) References Cited

U.S. PATENT DOCUMENTS

| | | | | |
|---|---|---|---|---|
| 8,357,922 | B2 | 1/2013 | Hong et al. | |
| 9,972,699 | B1 | 5/2018 | Sreenivasan et al. | |
| 2021/0263070 | A1* | 8/2021 | Janunts | G02B 6/4298 |
| 2022/0048764 | A1 | 2/2022 | Chen et al. | |
| 2023/0012003 | A1* | 1/2023 | Ma | G02B 7/021 |
| 2023/0067758 | A1* | 3/2023 | Loh | G02B 5/003 |
| 2023/0079303 | A1* | 3/2023 | Perrillat-Bottonet | G02B 1/00 359/601 |
| 2023/0094482 | A1 | 3/2023 | Lee et al. | |
| 2023/0194760 | A1* | 6/2023 | Hao | G02B 1/002 359/642 |
| 2023/0288773 | A1 | 9/2023 | Abdollahramezani et al. | |
| 2024/0210594 | A1* | 6/2024 | Yasuda | G02B 5/30 |
| 2024/0248237 | A1* | 7/2024 | Hao | G03F 7/0005 |

(Continued)

FOREIGN PATENT DOCUMENTS

| | | | |
|---|---|---|---|
| CN | 108336505 | A | 7/2018 |
| KR | 10-1002336 | B1 | 12/2010 |

(Continued)

OTHER PUBLICATIONS

Arbabi, Ehsan et al., "Multiwavelength polarization-insensitive lenses based on dielectric metasurfaces with meta-molecules", Optica, vol. 3, No. 6, Jun. 2016, pp. 628-631. (6 pages total).

*Primary Examiner* — Shahbaz Nazrul
(74) *Attorney, Agent, or Firm* — Sughrue Mion, PLLC

(57) ABSTRACT

A metalens includes a substrate, and a metasurface provided on the substrate and including a plurality of metaatoms, where at least one of the plurality of metaatoms may include a plurality of layers.

16 Claims, 8 Drawing Sheets

(56) References Cited

U.S. PATENT DOCUMENTS

| | | | | |
|---|---|---|---|---|
| 2025/0110256 | A1* | 4/2025 | Hao | G02B 5/1809 |
| 2025/0167515 | A1* | 5/2025 | Chung | H01S 5/04257 |
| 2025/0291227 | A1* | 9/2025 | Tan | G01S 7/4814 |
| 2025/0389980 | A1* | 12/2025 | Sokhoyan | G02F 1/0311 |

FOREIGN PATENT DOCUMENTS

| | | | |
|---|---|---|---|
| KR | 10-2018890 | B1 | 9/2019 |
| KR | 10-2023-0042979 | A | 3/2023 |
| WO | 2020/068844 | A1 | 4/2020 |
| WO | 2022/076063 | A2 | 4/2022 |

* cited by examiner

120

METALENS AND ELECTRONIC DEVICE USING THE SAME

CROSS-REFERENCE TO RELATED APPLICATION

This application is based on and claims priority to Korean Patent Application No. 10-2023-0144667, filed on Oct. 26, 2023, in the Korean Intellectual Property Office, the disclosure of which is incorporated herein by reference in its entirety.

BACKGROUND

1. Field

The disclosure relates to a metalens provided in a camera module of an electronic device.

2. Description of Related Art

For image sensing, an optical device may require an optical system capable of controlling light wavefronts or light paths. A lens for focusing incident light on an image sensor is typically used as the optical system.

A typical optical system may include a refractive optical system based on refraction of light. The refractive optical system may control light wavefronts or light paths of transmitted or reflected light by adjusting a degree of light refraction that occurs due to a difference in refractive index of materials when light passes through different materials.

The refractive optical system is advantageous in that the refractive optical system is easy to manufacture, and a design is intuitive if the refractive optical system is a simple optical system such as a lens. However, there is a drawback in that the refractive optical system is generally formed with a large thickness or uses a plurality of lenses, such that the system is difficult to be manufactured in a compact size, and design of the optical system becomes complicated for controlling a complex light wavefront or light path.

Thus, research is being conducted on diffractive optics having an optical structure smaller than a wavelength of light.

SUMMARY

Provided are a metalens including metaatoms form in a plurality of layers capable of reducing or eliminating chromatic aberration on a metasurface, and an electronic device using the same.

Additional aspects will be set forth in part in the description which follows and, in part, will be apparent from the description, or may be learned by practice of the presented embodiments of the disclosure.

According to an aspect of the disclosure, a metalens may include a substrate, and a metasurface provided on the substrate and including a plurality of metaatoms, where at least one of the plurality of metaatoms may include a plurality of layers.

The plurality of layers may include a bottom layer and a top layer and a length between a center and an edge of each layer of the plurality of layers may decrease from the bottom layer to the top layer.

A length between a center and an edge of the bottom layer may be between about 0.5 μm to about 5 μm.

The plurality of layers may be centered on a first axis.

The plurality of layers may have at least one of a cylinder shape, a polygonal column shape, a hollow cylinder shape, and a hollow polygonal column shape.

Each of the plurality of layers may have a height between about 5 μm to about 20 μm.

The plurality of layers may include three layers.

At least one layer of the plurality of layers may include a material that is different from a material of at least one other layer of the plurality of layers.

The plurality of layers may include at least one of silicon (Si) and germanium (Ge).

The plurality of metaatoms may be provided at intervals of about 4 μm to about 10 μm.

The substrate may include at least one of silicon (Si) and germanium (Ge).

According to an aspect of the disclosure, a camera module may include a metalens including a metasurface, the metasurface including a plurality of metaatoms, and an image sensor configured to convert an image, formed by the metalens, into an electrical signal, where at least one of the plurality of metaatoms may include a plurality of layers.

The plurality of layers may include a bottom layer and a top layer, and a length between a center and an edge of each layer of the plurality of layers may decrease from the bottom layer to the top layer.

A length between a center and an edge of the bottom layer may be between about 0.5 μm to about 5 μm.

The plurality of layers may have as at least one of a cylinder shape, a polygonal column shape, a hollow cylinder shape, and a hollow polygonal column shape.

Each of the plurality of layers may have a height between about 5 μm to about 20 μm.

The plurality of metaatoms may be provided at intervals of about 4 μm to about 10 μm.

The camera module may include an infrared filter configured to block an infrared component included in the image.

According to an aspect of the disclosure, an electronic device may include a camera module including a metalens comprising a metasurface, the metasurface including a plurality of metaatoms and an image sensor configured to convert an image, formed by the metalens, into an electrical signal to generate image data, and a processor configured to perform one or more image processing operations on the generated image data, where at least one of the plurality of metaatoms may include a plurality of layers.

The plurality of layers may include a bottom layer and a top layer and a length between a center and an edge of the plurality of layers may decrease from the bottom layer to the top layer.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION

Figure 1A:
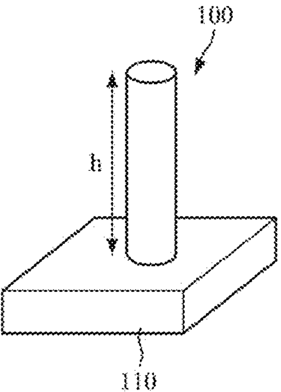
FIG. 1A is a diagram illustrating a metaatom according to an embodiment.

Reference will now be made in detail to embodiments, examples of which are illustrated in the accompanying drawings, where like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments will be described in detail with reference to the accompanying drawings. The embodiments described below are merely exemplary, and various modifications are possible from these embodiments. In the following drawings, the same reference numerals refer to the same components, and the size of each component in the drawings may be exaggerated for clarity and convenience of description.

In addition, unless explicitly described to the contrary, an expression such as "comprising" or "including" will be understood to imply the inclusion of stated elements but not the exclusion of any other elements. In addition, terms such as "unit" and "module" described in the specification may indicate a unit that processes at least one function or operation, and this may be implemented as hardware or software, or may be implemented as a combination of hardware and software.

In the following description, when a component is referred to as being "above" or "on" another component, it may be directly on an upper, lower, left, or right side of the other component while making contact with the other component or may be above an upper, lower, left, or right side of the other component without making contact with the other component.

Terms such as first, second, etc. may be used to describe various components, but are used only for the purpose of distinguishing one component from another component. These terms do not limit the difference in the material or structure of the components.

The terms of a singular form may include plural forms unless otherwise specified. In addition, when a certain part "includes" a certain component, it means that other components may be further included rather than excluding other components unless otherwise stated.

The use of the term "the" and similar designating terms may correspond to both the singular and the plural.

Operations of a method may be performed in an appropriate order unless explicitly described in terms of order. In addition, the use of all illustrative terms (e.g., etc.) is merely for describing technical ideas in detail, and the scope is not limited by these examples or illustrative terms unless limited by the claims.

In general, a basic structure of the diffractive optics may include dielectrics, such as so-called metaatoms, having a size ranging from hundreds of nanometers to several micrometers, and a metalens having a metasurface with metaatoms arranged in a two-dimensional plane may be used as the diffractive optics.

Figure 1B:
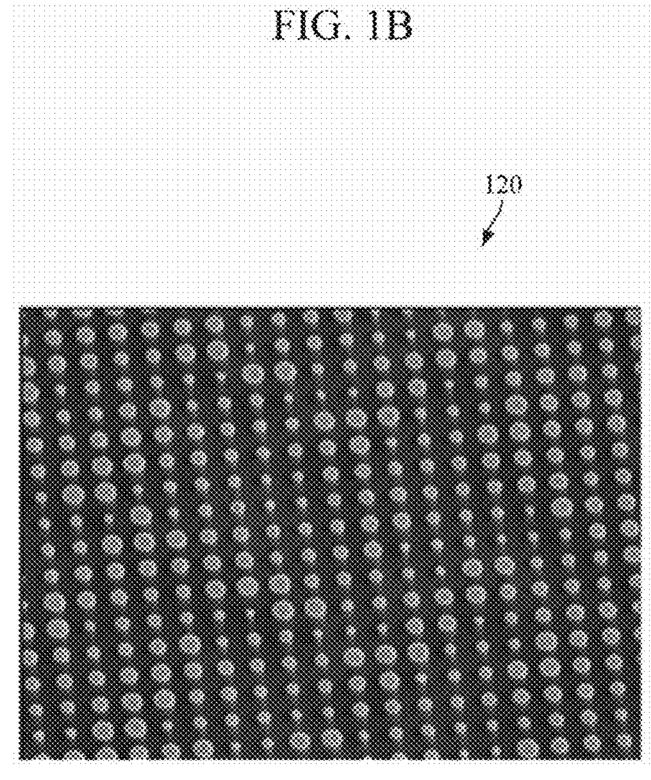
FIG. 1B is a diagram illustrating a scanning electron microscope (SEM) image of a metasurface on which a plurality of metaatoms are arranged according to an embodiment.

FIG. 1A is a diagram illustrating a metaatom according to an embodiment. FIG. 1B is a diagram illustrating a scanning electron microscope (SEM) image of a metasurface on which a plurality of metaatoms are arranged according to an embodiment.

Referring to FIGS. 1A and 1B, metaatoms 100 provided on the substrate 110 may vary in size (e.g., radius) and shape, and the metaatoms 100 having different sizes or shapes may be arranged in a two-dimensional plane to form a metasurface 120.

In a diffractive optical element (e.g., metalens), the size or shape of the metaatoms 100 may be set differently for optical modulation without modifying the overall shape of an optical system, such that a very thin optical system may be obtained as compared to a conventional refractive optical system. Further, complex optical modulation, such as polarization modulation, phase modulation, etc., may be easily achieved.

A metaatom 100 may have a cylindrical shape, and a phase change $\Phi(\omega)$ with a frequency $\omega$, which is generated when light passes through the metaatom 100 having a cylindrical shape from top to bottom, may be given as in Equation (1):

$$\phi(\omega) = 2\pi n_{eff}(\omega)\frac{h}{\lambda} \tag{1}$$

where $n_{eff}(\omega)$ denotes the effective refractive index, h denotes the height of the metaatom (see FIG. 1A), and $\lambda$ denotes the wavelength of light. In this case, the effective refractive index may be determined by a refractive index of a material of the metaatoms 100 and the size or shape of the metaatoms 100. Accordingly, the effective refractive index may be adjusted by varying the size and shape of the metaatoms 100, and thus a light wave phase at a corresponding position may be modulated as desired.

That is, by using the metasurface 120 on which the metaatoms 100, having different sizes or shapes, are arranged in a two-dimensional plane at intervals shorter than a wavelength of light, a light wavefront and light path of the transmitted light may be freely modulated.

However, chromatic aberration may occur on the metasurface 120 designed for light wave modulation. Chromatic aberration occurs when light of other wavelengths passes through an optical system designed for light of a specific wavelength, such that light wave modulation is implemented differently than designed. Furthermore, chromatic aberration may occur due to the refractive index of a material being different for each wavelength.

In order to reduce or eliminate chromatic aberration, the condition of a phase change (e.g., ($\Phi(r,\omega)$)) may be satisfied, which is required for light wave modulation at a specific point (e.g., r) on a plane when a light wave having a reference frequency (e.g., $\omega_0$) passes through the metasurface 120. Furthermore, in order to obtain the same phase change at different frequencies, the condition of phase dispersion $$\left(\text{e.g., } \frac{\partial \Phi}{\partial \omega}\right)$$

may be satisfied, which indicates a phase change due to a frequency change (i.e., how a phase changes at frequencies outside a reference frequency). That is, when designing the metasurface 120, both conditions of the phase change and the phase dispersion may be satisfied for eliminating chromatic aberration.

In this case, at least two or more degrees of design freedom may be mathematically necessary in order to simultaneously satisfy both conditions of the phase change and the phase dispersion. For example, if the height of the metaatom 100 is fixed at h as illustrated in FIG. 1A, the radius may be the changeable variable (i.e., only having one degree of design freedom), such that both conditions of the phase change and the phase dispersion may not be satisfied simultaneously.

Figure 1C:
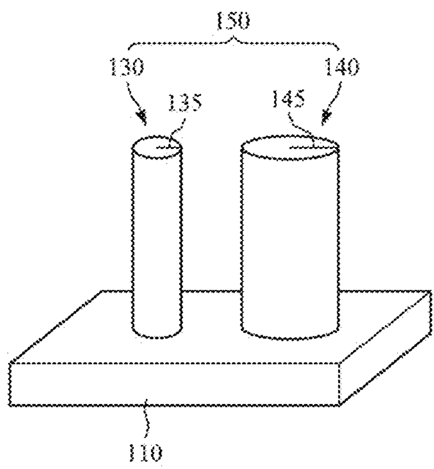
FIGS. 1C and 1D are diagrams illustrating a structure of a metaatom used for eliminating chromatic aberration according to an embodiment.
Figure 1D:
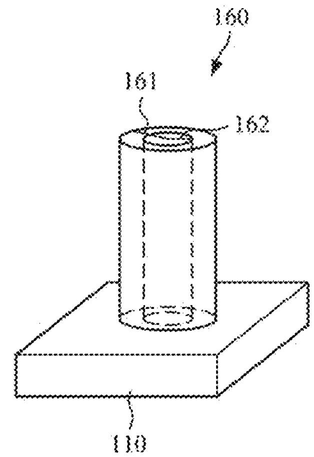

FIGS. 1C and 1D are diagrams illustrating a structure of a metaatom used for eliminating chromatic aberration according to an embodiment.

Referring to FIG. 1C, for example, a first metaatom 130 and a second metaatom 140 may form a metamolecule 150 and may be provided on a substrate 110. The first metaatom 130 and the second metaatom 140 may be bonded to form a metamolecule 150, such that a radius 135 of the first metaatom 130 and a radius 145 of the second metaatom 140 may correspond to the degrees of freedom. That is, two degrees of freedom may be obtained.

Referring to FIG. 1D, for example, a metaatom 160 may be provided on a substrate 110. The metaatom 160 may have a shape of a hollow cylinder with a hole formed therein, such that an outer radius 161 and an inner radius 162 correspond to degrees of freedom. That is, two degrees of freedom may be obtained.

However, according to FIG. 1C, as metaatoms (i.e., unit elements) increase in width, the density of metaatoms may be decreased when forming a metasurface, thereby decreasing light wave modulation resolution. In addition, as the length between metaatoms increases, the possibility of unwanted light scattering may also increase.

Further, according to FIG. 1D, a difference between the outer radius 161 and the inner radius 162 may not be large, thereby weakening the structure of metaatoms, and causing difficulties in semiconductor processing using photolithography.

Figure 2A:
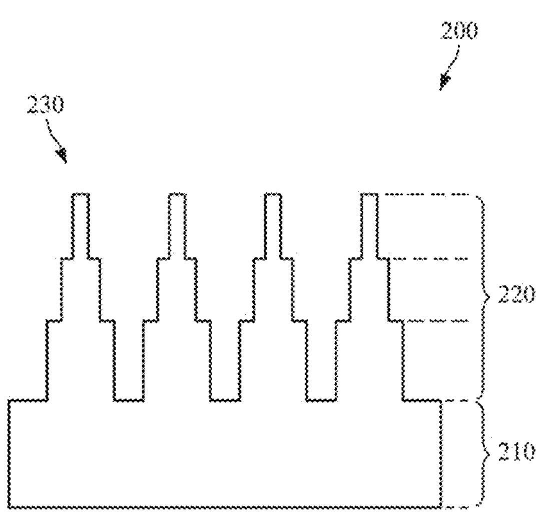
FIG. 2A is a diagram illustrating a metalens according to an embodiment.
Figure 2B:
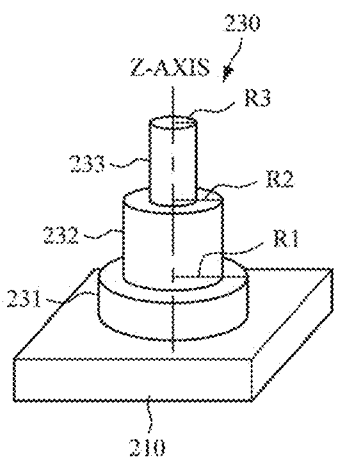
FIG. 2B is a diagram illustrating a metaatom including a plurality of layers according to an embodiment.
Figure 3A:
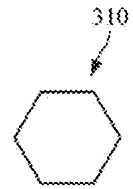
FIGS. 3A to 3E are diagrams illustrating a shape of a cross-section of a metaatom according to an embodiment.
Figure 3B:
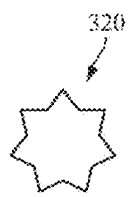
Figure 3C:
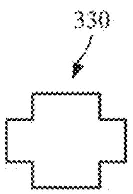
Figure 3D:
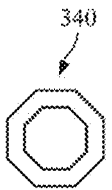
Figure 3E:
Figure 3E:
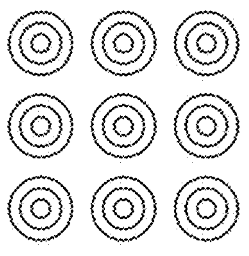

FIG. 2A is a diagram illustrating a metalens according to an embodiment. FIG. 2B is a diagram illustrating a metaatom including a plurality of layers according to an embodiment. As described herein, the metalens may operate in a long-wave infrared (IR) (LWIR) wavelength range (e.g., about 8 μm to about 14 μm), but is not limited thereto, and may operate in other wavelength regions, such as a visible wavelength region and the like.

Referring to FIGS. 2A and 2B, a metalens 200 may include a substrate 210 and a metasurface 220 including metaatoms 230. The metalens 200 is a type of diffractive optical element. That is, the metalens 200 is a lens having a metasurface 220 on which the metaatoms 230 may be arranged in a two-dimensional plane.

The substrate 210 may include a semiconductor material (e.g., silicon (Si) or germanium (Ge)) and may also be made of various materials, such as glass, crystal, polymer, and plastic. The substrate 210 may include a material which is the same as or different from the metasurface 220.

The metasurface 220 may be provided on top of the substrate 210 and may include a plurality of metaatoms 230. In this case, each metaatom 230 may be include a plurality of layers, such that the metaatoms 230 may be configured to reduce or eliminate chromatic aberration on the metasurface 220.

As described above, in order to reduce or eliminate chromatic aberration when designing the metasurface 220, both conditions of the phase change and the phase dispersion may be simultaneously satisfied, and two or more degrees of design freedom may be necessary to obtain metaatoms that satisfy both of the two conditions simultaneously.

Referring to FIG. 2B, for example, the metaatom 230 may be include three layers 231, 232 and 233. Radii R1, R2 and R3 of the respective layers 231, 232, and 233 of the metaatom 230 may correspond to adjustable degrees of freedom, such that three degrees of design freedom may be obtained, thereby satisfying the conditions for eliminating chromatic aberration.

In this case, the phase change and phase dispersion of the metaatom 230 including N layers may be represented by Equations (2) and (3):

$$\Phi = \sum_{n=1}^{N} \Phi_n \tag{2}$$

$$\frac{\partial \Phi}{\partial \omega} = \sum_{n=1}^{N} \frac{\partial \Phi_n}{\partial \omega} \tag{3}$$

where the phase change Φ of the metaatom 230 (Equation (2)) including N layers may denote a sum of phase changes of the respective layers, and the phase dispersion $$\frac{\partial \Phi}{\partial \omega}$$

thereof (Equation (3)) may denote a sum of phase dispersions of the respective layers.

The respective layers of the metaatom 230 may be centered on the same Z-axis, and the length between the center and edge of each layer may decrease from the bottom layer to the top layer. For example, the metaatom 230 may be formed such that the radii R1, R2 and R3 may decrease in length from bottom layer 231, to the middle layer 232 and to the top layer 233, thereby ensuring semiconductor process efficiency. In this case, the length between the center and edge of a bottom layer 231 may be between about 0.5 μm to about 5 μm.

While FIG. 2B illustrates an example in which each layer of the metaatom 230 has a cylindrical shape, the metaatom 230 may also have a shape of a polygonal column, a hollow cylinder, or a hollow polygonal column, but the shape thereof is not limited thereto.

FIGS. 3A to 3E are diagrams illustrating a shape of a cross-section of a metaatom according to an embodiment. The cross-section of each layer of the metaatom 230 may have a shape of a hexagon 310, a star 320, a non-uniform polygon 330, a hollow octagon 340, etc., and the shape thereof may be determined in consideration of a phase change and phase dispersion of the metaatom 230. In addition, referring to FIG. 3E, the metaatom 230 may have a multi-hole structure 350, rather than a column shape, but the shape is not limited thereto.

Each layer of the metaatom 230 may have a height between about 5 μm and about 20 μm, with different heights for each layer. In addition, the metaatoms 230 may be arranged at regular intervals of about 4 μm and about 10 μm, thereby preventing unnecessary light scattering.

Each layer of the metaatom 230 may include a semiconductor material such as silicon or germanium or a compound thereof. All of the layers may include the same material, and in some embodiments, various layers may include different materials. The materials for forming the layers of the metaatom 230 are not limited thereto.

A metaatom having a hollow cylindrical shape may have a decreased density, and the structure thereof may be weakened.

However, according to some embodiments, the metaatom may include a plurality of layers. The metaatoms may be arranged in a depth direction, rather than in a plane direction, in order to increase the degree of freedom, thereby increasing the density of the metaatom. By using a metaatom having a solid cylindrical shape, the problem associated with a weakened structure may be solved.

In the metaatom including a plurality of layers, the phase change and phase dispersion may be determined according to Equations (2) and (3). Thus, the metalens may be easily implemented by classifying and storing the number of layers of the metaatom and the size or shape of the metaatom, etc., which correspond to the phase change and phase dispersion for desired optical modulation, in a database.

The metalens including the metaatom having a plurality of layers may operate in all wavelength regions, including an infrared region as well as a visible region.

In addition, in a metaatom having a plurality of layers, transmittance of light passing through the metasurface increases, compared to a metaatom having a single layer.

Figure 4A:
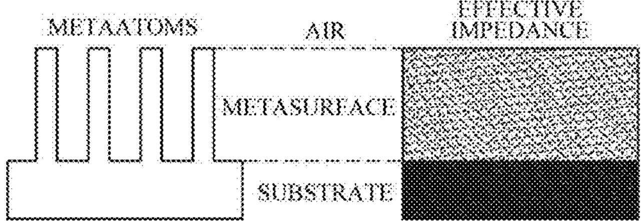
FIG. 4A is a diagram illustrating optical effective impedance of a metalens with single-layer metaatoms according to an embodiment.
Figure 4B:
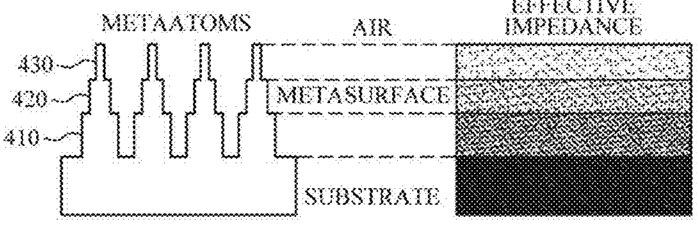
FIG. 4B is a diagram illustrating optical effective impedance of a metalens with multi-layer metaatoms according to an embodiment.

FIG. 4A is a diagram illustrating optical effective impedance of a metalens with single-layer metaatoms according to an embodiment. FIG. 4B is a diagram illustrating optical effective impedance of a metalens with multi-layer metaatoms according to an embodiment. In FIGS. 4A and 4B, the optical effective impedances in the respective layers are shown in different shades.

Generally, light reflects at an interface between media. Light reflectance increases as an impedance difference between two media forming the interface increases, and light transmittance decreases as light reflectance increases.

As shown in FIG. 4A, on a metalens, substrate layer may be provided, a metasurface may be provided on the substrate layer, and an air layer may be above the metasurface. Light may pass through the three layers with different impedances from the top layer (i.e., the air layer) to the bottom layer (i.e., the substrate layer). As shown in FIG. 4B, on a metalens, a substrate layer may be provided, a metasurface may be provided on the substrate layer, and an air layer may be above the metasurface. The metasurface may include a first layer 410, a second layer 420 and a third layer 430. Thus, five layers may be provided on top of the metalens of FIG. 4B, and light may pass through the five layers with different impedances from the top layer (i.e., the air layer) to the bottom layer (i.e., the substrate layer).

In this case, light may be required to pass through more layers in the structure of FIG. 4B than in the structure in FIG. 4A, such that an impedance difference between the media decreases more in FIG. 4B than in FIG. 4A. Accordingly, light reflectance decreases more in the structure of FIG. 4B, resulting in higher light transmittance than in the structure of FIG. 4A.

Figure 5:
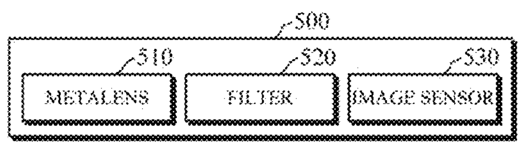
FIG. 5 is a block diagram illustrating a camera module including a metalens according to an embodiment.

FIG. 5 is a block diagram illustrating a camera module including a metalens according to an embodiment.

Referring to FIG. 5, a camera module 500 may include a metalens 510, a filter 520, and an image sensor 530.

The metalens 510 may have a metasurface including a plurality of metaatoms, in which each metaatom may include a plurality of layers configured to reduce or eliminate chromatic aberration on the metasurface.

A length between the center and edge of each layer of each metaatom may decrease from a bottom layer to a top layer, and a length between the center and edge of a bottom layer of each metaatom may be between about 0.5 μm to about 5 μm. Further, each layer of each metaatom may have a height between about 5 μm and about 20 μm.

Each layer of each metaatom may have at least one shape among a cylinder, a polygonal column, a hollow cylinder, and a hollow polygonal column, and thus, the cross-section of each layer of the metaatom may have a shape of, for example, a hexagon, a star, a non-uniform polygon, a hollow octagon, and the like.

In addition, the respective metaatoms may be arranged on the metasurface at intervals of about 4 μm and about 10 μm, but the interval is not limited thereto.

The image sensor 530 may convert an image, formed by the metalens, into an electrical signal. The image sensor 530 may convert light, emitted or reflected from an object and transmitted through the metalens, into an electrical signal to acquire an image corresponding to the object. The image sensor 530 may include at least one of an RGB sensor, a black and white (BW) sensor, an IR sensor, and an ultraviolet (UV) sensor, but is not limited thereto. In addition, each sensor included in the image sensor 530 may be implemented as a charged coupled device (CCD) sensor and/or a complementary metal oxide semiconductor (CMOS) sensor.

The filter 520 may be provided between the metalens 510 and the image sensor 530, and for example, an infrared filter may be provided to remove an infrared component included in the image.

Figure 6:
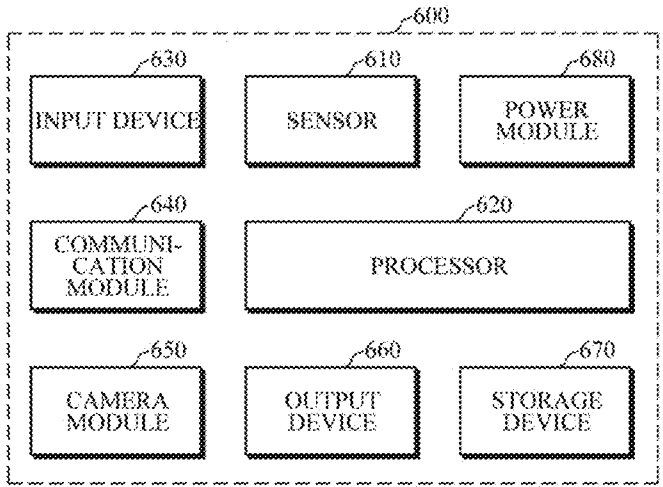
FIG. 6 is a block diagram of an electronic device including a camera module according to an embodiment.

FIG. 6 is a block diagram of an electronic device including a camera module according to an embodiment.

An electronic device which will be described below may include, for example, at least one of a wearable device, a smartphone, a tablet personal computer (PC), a mobile phone, a video phone, an electronic book reader, a desktop computer, a laptop computer, a netbook computer, a workstation, a server, a personal digital assistant (PDA), a portable multimedia player (PMP), an MP3 player, a medical device, and a camera. The wearable device may include at least one of an accessory type wearable device (e.g., wristwatch, ring, bracelet, anklet, necklace, glasses, contact lens, or head mounted device (HMD)), a textile/clothing type wearable device (e.g., electronic clothing), a body-mounted type wearable device (e.g., skin pad or tattoo), and a body implantable type wearable device. However, the wearable device is not limited thereto and may include, for example, various types of medical equipment including various portable medical measuring devices (antioxidant measuring device, blood glucose monitor, heart rate monitor, blood pressure measuring device, thermometer, etc.), magnetic resonance angiography (MRA), magnetic resonance imaging (MRI), computed tomography (CT), imaging system, ultrasonic system, etc.) and the like. However, the electronic device is not limited to the above devices.

Referring to FIG. 6, an electronic device 600 may include a sensor 610, a processor 620, an input device 630, a communication module 640, a camera module 650, an output device 660, a storage device 670, and a power module 680. The components of the electronic device 600 may be integrated into a specific device, or may be distributed in two or more devices.

The sensor 610 may detect an operating state (e.g., temperature, power, etc.) of the electronic device 600 or an external environmental condition (e.g., user state), etc., and may generate an electrical signal and/or data corresponding to the detected state. The sensor 610 may include a gyro sensor, a pulse wave sensor, an acceleration sensor, a fingerprint sensor, etc., but is not limited thereto.

The processor 620 may control components connected to the processor 620 by executing programs and the like stored in the storage device 670, and may perform processing of various data or perform operations. The processor 620 may include a main processor (e.g., a central processing unit (CPU) or an application processor (AP), etc.) and an auxiliary processor (e.g., a graphics processing unit (GPU), an image signal processor (ISP), a sensor hub processor, or a communication processor (CP)), which is operable independently from, or in conjunction with, the main processor, and the like.

The input device 630 may receive instructions and/or data for use in the respective components of the electronic device 600 from a user and the like. The input device 630 may include a microphone, a mouse, a keyboard, and/or a digital pen (e.g., a stylus pen, etc.), and the like.

The communication module 640 may support establishment of a direct (e.g., wired) communication channel and/or a wireless communication channel between the electronic device 600 and another electronic device, a server, or the sensor 610 within a network environment, and may perform communication via the established communication channel. The communication module 640 may include one or more communication processors that operate independently from the processor 620 and support direct communication and/or wireless communication.

The communication module 640 may include a wireless communication module, such as a cellular communication module, a short-range wireless communication module, a global navigation satellite system (GNSS) communication module, etc., and/or a wired communication module, such as a local area network (LAN) communication module, a power line communication module, and the like. These various types of communication modules may be integrated into a single chip and the like, or may be implemented as a plurality of separate chips. The wireless communication module may check and authenticate the electronic device 600 in a communication network by using subscriber information (e.g., international mobile subscriber identifier (IMSI), etc.,) stored in a subscriber identification module.

The camera module 650 may capture still images or moving images. The camera module 650 may include a lens assembly having one or more lenses, image sensors, image signal processors, infrared filter, and/or flashes. The lens assembly included in the camera module 650 may collect light emitted from an object to be imaged.

For example, the camera module 650 may include a metalens having a metasurface including a plurality of metaatoms, and an image sensor configured to convert an image, formed by the metalens, into an electrical signal to generate image data. Each metaatom may include a plurality of layers, such that the metaatom is configured to reduce or eliminate chromatic aberration on the metasurface. In this case, a length between the center and edge of each layer of each metaatom may decrease from a bottom layer to a top layer.

The processor 620 may include a processor of the aforementioned camera module 650, and may perform one or more image processing operations on the image data generated by the camera module 650.

The output device 660 may visually/non-visually output the data generated or processed by the electronic device 600. The output device 660 may include a sound output device, a display device, an audio module, and/or a haptic module.

The sound output device of the output device 660 may output sound signals to the outside of the electronic device 600. The sound output device of the output device 660 may include a speaker and/or a receiver. The speaker may be used for general purposes, such as playing multimedia or playing record, and the receiver may be used for incoming calls. The receiver may be implemented separately from, or as part of, the speaker.

The display device of the output device 660 may visually provide information to the outside of the electronic device 600. The display device of the output device 660 may include, for example, a display, a hologram device, or a projector and control circuitry to control the devices. The display device of the output device 660 may include touch circuitry adapted to detect a touch, and/or sensor circuitry (e.g., pressure sensor, etc.) adapted to measure the intensity of force incurred by the touch.

The audio module of the output device 660 may convert a sound into an electrical signal or vice versa. The audio module of the output device 660 may obtain the sound via the input device, or may output the sound via the sound output device, and/or a speaker and/or a headphone of another electronic device directly or wirelessly connected to the electronic device 600.

The haptic module of the output device 660 may convert an electrical signal into a mechanical stimulus (e.g., vibration, motion, etc.) or electrical stimulus which may be recognized by a user by tactile sensation or kinesthetic sensation. The haptic module of the output device 660 may include, for example, a motor, a piezoelectric element, and/or an electric stimulator.

The storage device 670 may store operating conditions required for operating the sensor 610, and various data required for other components of the electronic device 600. The various data may include, for example, input data and/or output data for software and instructions related thereto. The storage device 670 may include a volatile memory and/or a non-volatile memory.

The power module 680 may manage power supplied to the electronic device 600. The power module 680 may be implemented as part of, for example, a power management integrated circuit (PMIC). The power module 680 may include a battery, which may include a primary cell which is not rechargeable, a secondary cell which is rechargeable, and/or a fuel cell.

Various embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Examples of the computer-readable recording medium include a read-only memory (ROM), a random access memory (RAM), a CD-ROM, a magnetic tape, a floppy disc, an optical data storage, and a carrier wave (e.g., data transmission through the Internet). The computer-readable recording medium may be distributed over a plurality of computer systems connected to a network such that a computer-readable code is written thereto and executed therefrom in a decentralized manner. Functional programs, codes, and code segments needed for realizing embodiments of the disclosure may be readily inferred by one of ordinary skill in the art.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A metalens comprising:

a substrate; and a metasurface provided on the substrate and comprising a plurality of metaatoms, wherein at least one of the plurality of metaatoms comprises a plurality of layers, and wherein the plurality of layers comprise a first layer, a second layer and a third layer sequentially stacked in a first direction from the substrate, each having, in a second direction intersecting the first direction, a different length between a center and an edge, and wherein the length between the center and the edge of the first layer is greater than the length between the center and the edge of the second layer, and the length between the center and the edge of the second layer is greater than the length between the center and the edge of the third layer.

2. The metalens of claim 1, wherein the length between the center and the edge of the first layer is between about 0.5 μm to about 5 μm.

3. The metalens of claim 1, wherein the plurality of layers are centered on a first axis.

4. The metalens of claim 1, wherein the plurality of layers have at least one of a cylinder shape, a polygonal column shape, a hollow cylinder shape, and a hollow polygonal column shape.

5. The metalens of claim 1, wherein each of the plurality of layers have a height between about 5 μm to about 20 μm.

6. The metalens of claim 1, wherein at least one layer of the plurality of layers comprises a material that is different from a material of at least one other layer of the plurality of layers.

7. The metalens of claim 1, wherein the plurality of layers comprise at least one of silicon (Si) and germanium (Ge).

8. The metalens of claim 1, wherein the plurality of metaatoms are provided at intervals of about 4 μm to about 10 μm.

9. The metalens of claim 1, wherein the substrate comprises at least one of silicon (Si) and germanium (Ge).

10. A camera module comprising:

a metalens comprising a metasurface, the metasurface comprising a plurality of metaatoms; and an image sensor configured to convert an image, formed by the metalens, into an electrical signal, wherein at least one of the plurality of metaatoms comprises a plurality of layers, and wherein the plurality of layers comprise a first layer, a second layer and a third layer sequentially stacked in a first direction, each having, in a second direction intersecting the first direction, a different length between a center and an edge, and wherein the length between the center and the edge of the first layer is greater than the length between the center and the edge of the second layer, and the length between the center and the edge of the second layer is greater than the length between the center and the edge of the third layer.

11. The camera module of claim 10, wherein the length between the center and the edge of the first layer is between about 0.5 μm to about 5 μm.

12. The camera module of claim 10, wherein the plurality of layers have as at least one of a cylinder shape, a polygonal column shape, a hollow cylinder shape, and a hollow polygonal column shape.

13. The camera module of claim 10, wherein each of the plurality of layers have a height between about 5 μm to about 20 μm.

14. The camera module of claim 10, wherein the plurality of metaatoms are provided at intervals of about 4 μm to about 10 μm.

15. The camera module of claim 10, further comprising an infrared filter configured to block an infrared component included in the image.

16. An electronic device comprising:

a camera module comprising:

a metalens comprising a metasurface, the metasurface comprising a plurality of metaatoms; and an image sensor configured to convert an image, formed by the metalens, into an electrical signal to generate image data; and a processor configured to perform one or more image processing operations on the generated image data, wherein at least one of the plurality of metaatoms comprises a plurality of layers, and wherein the plurality of layers comprise a first layer, a second layer and a third layer sequentially stacked in a first direction, each having, in a second direction intersecting the first direction, a different length between a center and an edge, and wherein the length between the center and the edge of the first layer is greater than the length between the center and the edge of the second layer, and the length between the center and the edge of the second layer is greater than the length between the center and the edge of the third layer.

* * * * *